United States Patent [19]

Connors et al.

[11] Patent Number: 5,836,677
[45] Date of Patent: Nov. 17, 1998

[54] RETROFIT COMPACT FLUORESCENT LAMP

[75] Inventors: William T. Connors, Newark, Del.; Gordon L. McGregor, Landenberg, Pa.; Raymond B. Minor, Elkton, Md.

[73] Assignee: W.L. Gore & Associates, Inc., Newark, Del.

[21] Appl. No.: 795,491

[22] Filed: Feb. 5, 1997

[51] Int. Cl.$^6$ ............................... F21V 7/22; F21V 17/06
[52] U.S. Cl. ..................... 362/304; 362/216; 362/220; 362/277; 362/285; 362/364; 362/372
[58] Field of Search ................... 362/296, 297, 362/349, 304, 364, 216, 217, 220, 277, 285, 319, 372

[56] References Cited

U.S. PATENT DOCUMENTS

| | | | |
|---|---|---|---|
| 3,316,399 | 4/1967 | Totten | 362/364 |
| 3,953,556 | 4/1976 | Gore | 264/288 |
| 3,962,153 | 6/1976 | Gore | 260/2.5 R |
| 4,035,085 | 7/1977 | Seiner | 356/179 |
| 4,096,227 | 6/1978 | Gore | 264/210 R |
| 4,152,618 | 5/1979 | Abe et al. | 313/116 |
| 4,186,433 | 1/1980 | Baldwin | 362/364 |
| 4,187,390 | 2/1980 | Gore | 174/102 R |
| 4,354,741 | 10/1982 | Mano et al. | 350/357 |
| 4,463,045 | 7/1984 | Ahr et al. | 428/131 |
| 4,504,889 | 3/1985 | Goldfarb | 362/200 |
| 4,523,319 | 6/1985 | Pfost | 372/54 |
| 4,549,252 | 10/1985 | Ripley et al. | 362/216 |
| 4,571,448 | 2/1986 | Barnett | 136/259 |
| 4,764,932 | 8/1988 | Peterson et al. | 372/35 |
| 4,772,124 | 9/1988 | Wooten et al. | 356/218 |
| 4,805,181 | 2/1989 | Gibson et al. | 372/72 |
| 4,902,423 | 2/1990 | Bacino | 210/500.36 |
| 4,912,720 | 3/1990 | Springsteen | 372/72 |
| 4,994,673 | 2/1991 | Perna et al. | 250/483.1 |
| 5,037,618 | 8/1991 | Hager | 422/186.03 |
| 5,051,878 | 9/1991 | Ngai | 362/299 |

(List continued on next page.)

FOREIGN PATENT DOCUMENTS

| | | |
|---|---|---|
| 0 313 263 | 10/1988 | European Pat. Off. . |
| 0 372 224 | 6/1990 | European Pat. Off. . |
| 0 496 323 A2 | 1/1992 | European Pat. Off. . |
| 40 16 531 A1 | 11/1991 | Germany . |
| 44 34 124 A1 | 3/1996 | Germany . |
| 7-235714 | 9/1995 | Japan . |
| 96/19695 | 6/1996 | WIPO . |
| 96/21168 | 7/1996 | WIPO . |

OTHER PUBLICATIONS

Literature: TK Lewellen, RS Miyaoka, SG Kohlmyer, "Improving the Performance of the SP–3000 PET Detector Modules," University of Washington, Seattle, Washington, Nov. 1991, pp. 1604–1608.

Literature: K. Wisshak, F. Kappeler, and H. Muller, "Prototype Crystals For the Karlsruhe 4 Barium Fluoride Detector," Physics Research A251 (1986) 101–107.

Literature: Carol J. Bruegge, Albert E. Stiegman, Daniel R. Coulter, Robert R. Hale, David J. Diner, "Reflectance stability analysis of Spectralon diffuse calibration panels," SPIE vol. 1493 (1991), pp. 132–142.

Literature: A.W. Springsteen, "A Novel Class of Lambertian Reflectance Materials for Remote Sensing Application," Labsphere, Inc., SPIE, vol. 1109, Optical Radiation Measurements II (1989) pp. 133–141.

Technical Information: Arthur W. Springsteen, Ph.D., "Properties of Spectralon Reflectance Material," (Date Unknown).

(List continued on next page.)

*Primary Examiner*—Alan Cariaso
*Attorney, Agent, or Firm*—David J. Johns

[57] ABSTRACT

A retrofit recessed compact fluorescent lamp (CFL) system that delivers quality aesthetics, glare control, and high efficiency light output. The system comprises a reflector unit adapted to be installed into an existing light fixture to provide an improved environment for distribution of light from a CFL. The system is compatible with a range of existing light fixture heights and styles.

46 Claims, 4 Drawing Sheets

U.S. PATENT DOCUMENTS

| | | | |
|---|---|---|---|
| 5,075,827 | 12/1991 | Smith | 362/221 |
| 5,116,115 | 5/1992 | Lange et al. | 351/212 |
| 5,189,339 | 2/1993 | Peshak | 362/216 |
| 5,192,128 | 3/1993 | Ngai | 362/297 |
| 5,197,798 | 3/1993 | Tickner | 362/216 |
| 5,241,180 | 8/1993 | Ishaque et al. | 250/361 R |
| 5,263,042 | 11/1993 | Kojima et al. | 372/72 |
| 5,378,965 | 1/1995 | Dakin et al. | 315/248 |
| 5,398,179 | 3/1995 | Pacheco | 362/364 |
| 5,422,756 | 6/1995 | Weber | 359/487 |
| 5,440,471 | 8/1995 | Zadeh | 362/364 |
| 5,462,705 | 10/1995 | Springsteen | 264/122 |
| 5,463,540 | 10/1995 | Jones | 362/216 |
| 5,488,473 | 1/1996 | Springsteen et al. | 356/317 |
| 5,584,575 | 12/1996 | Fickel | 362/364 |
| 5,707,143 | 1/1998 | Hentz | 362/364 |

OTHER PUBLICATIONS

General Information: Reflectance Component Fabrication, "Diffuse Reflectance Materials and Coatings, Spectralon, Spectraflect, Duraflect, Infragold and Infragold–LF," (Date Unknown).

Literature: "Solid Sample Measurements with the Cary 4 and Cary 5 Spectrophotometers," (Date Unknown) UV–VIS–NIR, Varian (VA).

Brochure: "Leadership," Dr. Arthur Springsteen, Lapshere (Date Unknown).

Brochure: "Labsphere Corporate Profile," Labsphere (Date Unknown).

Robert D. Saunders and Henry J. Kostkowski, "Roughened Quartz Surfaces and Teflon as small angle diffusers and depolarizers between 200 and 400 nm," Applied Optic, vol. 28, No. 15, Aug. 1, 1989 pp. 3242–3245.

Victor R. Weidner and Jack J. Hsia, "Reflection Properties of Pressed Polytetrafluoroethylene Powder," J. Optical Society of America, vol. 71, No. 7, Jul. 1981, pp. 856–861 International Search Report for PCT/US96/15111.

S. Nutter, C.R. Bower, N.W. Gebhard, R.M. Heinz and G. Spiczak, "Sintered Halon as a Diffuse Reflecting Liner for Light Integration Boxes," Nuclear Instruments & Methods in Physics Research, vol. A310, No. 3, Dec. 15, 1991, pp. 665–670.

RETROFIT COMPACT FLUORESCENT LAMP

BACKGROUND OF THE INVENTION

1. Field of the Invention

The present invention relates to lighting systems, such as lighting systems mounted on or in a wall or ceiling.

2. Description of Related Art

In terms of providing light and aesthetics, recessed ceiling lighting is a highly desirable light source. Unfortunately, incandescent lamps used in many recess lighting applications have proven to be unduly expensive to operate. First, incandescent lamps used in these applications typically consume an excessive amount of power, generally consuming 75, 100, or 150 watts per lamp, which can be costly. Second, incandescent lamps normally have relatively short lives. Accordingly, frequent replacement of lamps adds to the cost of operating incandescent lighting systems.

Therefore, it is desirable to retrofit existing recessed incandescent downlights using compact fluorescent lamps (CFLs). CFLs are preferred since they utilize roughly one fourth of the energy input for the same luminance output. Additionally, CFLs generally have greater operational life than comparable incandescent lamps. Unfortunately, there are a number of factors that limit the ability to retrofit CFLs effectively into existing recessed incandescent lamp fixtures.

One way of categorizing CFLs is by the way that they are ballasted. One method incorporates an integrated ballast and lamp assembly in which the entire lamp assembly is replaced at one time. These lamps are typically screw-based mounted to directly fit the existing Edison-based socket within the fixture to be retrofitted. Screw-based integrated ballasted retrofit CFLs are popular because they enable simple replacement, and allow for a variety of different wattage lamps to be used.

The other method of providing a ballast on a CFL separates the ballast from the lamp, enabling the user to replace the lamp only. These lamps are typically pin-based mounted. Within this category, there are both screw based ballasts and separate hard wired ballasts. The screw based types again allow for simple retrofit and replacement.

Usually a cylindrical recessed downlight fixture is mounted in the ceiling. A socket connected to an L-shaped bracket is usually vertically adjustable within the cylindrical fixture to hold the reflector lamp at a desirable height. Before inserting the reflector lamp in the cylindrical housing and screwing the lamp base into the socket, a trim ring or baffle is added to the housing typically by attaching springs to the bale or trim ring at diametrically opposite positions, and stretching the springs upward and attaching them to openings in the sheet metal cylindrical housing.

When the socket is not adjustable, the reflector lamp or retrofit CFL may be positioned too deep within the cylindrical fixture (i.e., resulting in light lost within the fixture) or may extend downward from the cylindrical fixture (i.e., resulting in an unsightly appearance). Therefore, it is highly desirable to retrofit a variety of different depth fixtures while being able to adjust for a range of socket to aperture distances.

In many current CFL retrofits, a reflector is attached to an integrated ballasted lamp, attempting to simulate the appearance of a standard incandescent reflector flood lamp or par lamp. Unfortunately, a dark annular space is often created between the trim ring and the reflector, resulting in an unattractive appearance. Furthermore, these types of retrofits typically lack suitable light output or efficiency and have very poor glare control.

Accordingly, it is a primary purpose of the present invention to provide an improved apparatus for retrofitting lamp fixtures with CFLs.

This purpose and other purposes of the present invention will become evident from review of the following specification.

SUMMARY OF THE INVENTION

The present invention is an improved reflector unit in combination with a compact fluorescent lamp (CFL) to retrofit an existing lamp fixture, such as a recessed incandescent downlight. The reflector assembly of the present invention maximizes light efficiency in a reflective recessed cavity, which substantially surrounds the CFL, thus dramatically increasing the light output of the CFL luminaire.

The preferred reflector unit of the present invention comprises a reflective lower section having an essentially elliptical shape, and a reflective upper section having an essentially cylindrical shape. The reflector unit is adapted to be inserted within an existing lamp fixture and provide a carefully proportioned reflective surface to maximize light output from the compact fluorescent lamp. A reflective disk is provided to surround the base of a CFL lamp and fit within the upper section of the reflector unit. The reflective disk has an outer diameter substantially matching an inner diameter of the upper section so as to minimize light loss within the reflector unit. Preferably, the position of the reflector unit and reflective disk can be adjusted relative to one another so as to custom fit the position of the CFL lamp to the dimensions of each lamp fixture.

The reflector unit of the present invention provides numerous benefits. First, the reflector unit provides the ability to adjust to a range of socket to aperture distances of different recessed fixtures, while still maintaining optimal efficiencies, aesthetics, and glare control. Additionally, the reflector unit of the present invention eliminates the common problem of a dark annular space between the fixture and a retrofitted reflector. This dramatically improves the aesthetic appearance of the retrofitted lamp.

Further, the reflective unit of the present invention can accommodate both integrated ballasted CFL's and screw based ballasts that employ pin-based CFLs.

The present invention preferably employs a reflectant material of expanded polytetrafluoroethylene (PTFE) comprising polymeric nodes interconnected by fibrils defining a microporous structure. This reflective material has been shown to have exceptionally high reflectivity and is particularly suitable for use with CFLs.

DESCRIPTION OF THE DRAWINGS

The operation of the present invention should become apparent from the following description when considered in conjunction with the accompanying drawings, in which.

DETAILED DESCRIPTION OF THE INVENTION

The present invention is an improved reflector unit for use in retrofitting existing lamp fixtures with a compact fluorescent lamp (CFL). The present invention may be used to retrofit a variety of lamp fixtures, such as recessed ceiling or wall mounted lights, spotlights, track lights, and tube downlights. The present invention is particularly applicable for use with recessed lamp fixtures, such as recessed downlights commonly known as recessed "cans" or "high hats."

Figure 1:
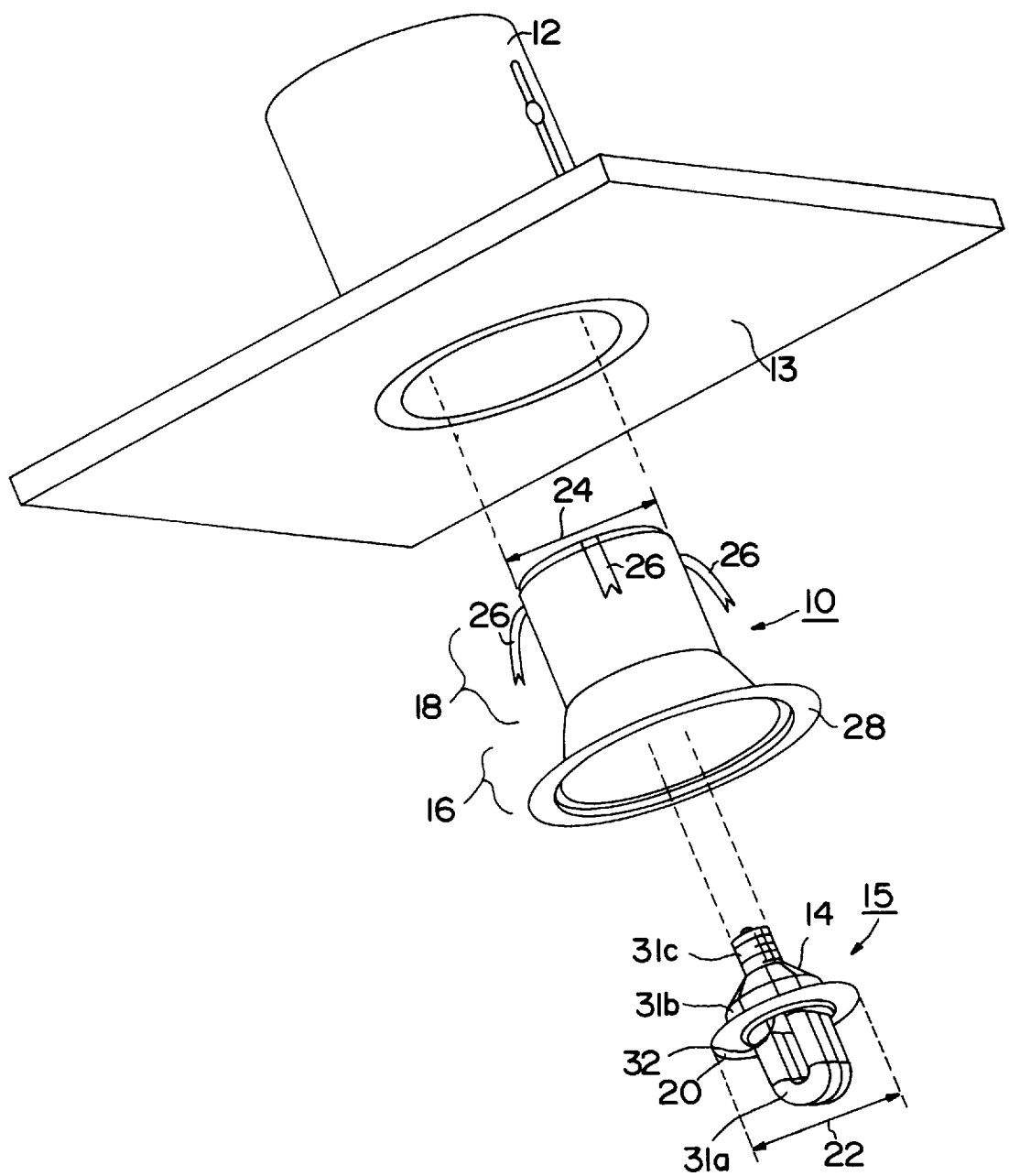
FIG. 1 is an exploded perspective view of a recessed lamp fixture, retrofit reflector unit of the present invention, and a compact fluorescent lamp.
Figure 2:
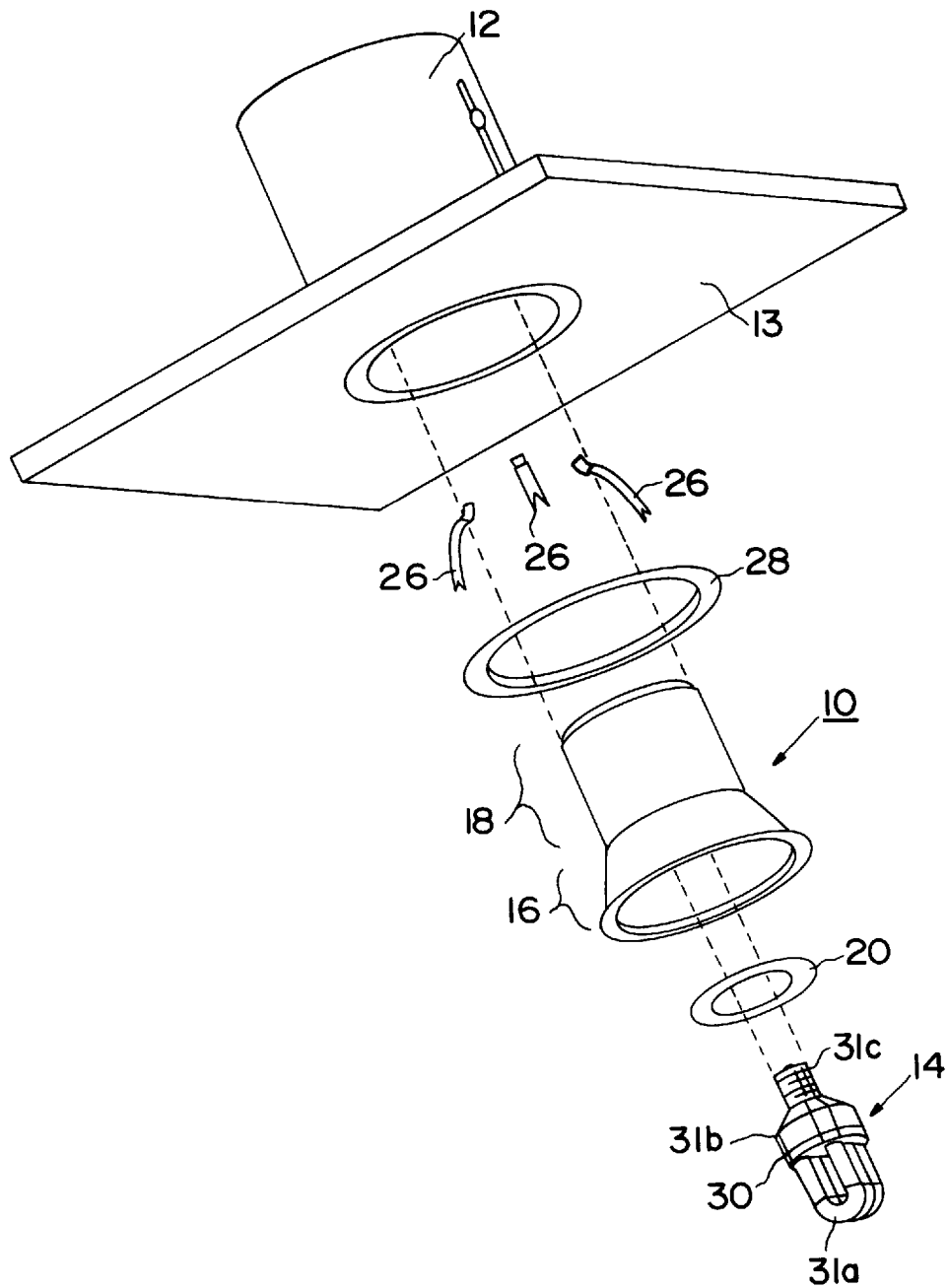
FIG. 2 is a more fully exploded perspective view of a recessed lamp fixture, the retrofit reflective unit of the present invention, and a compact fluorescent lamp.
Figure 3:
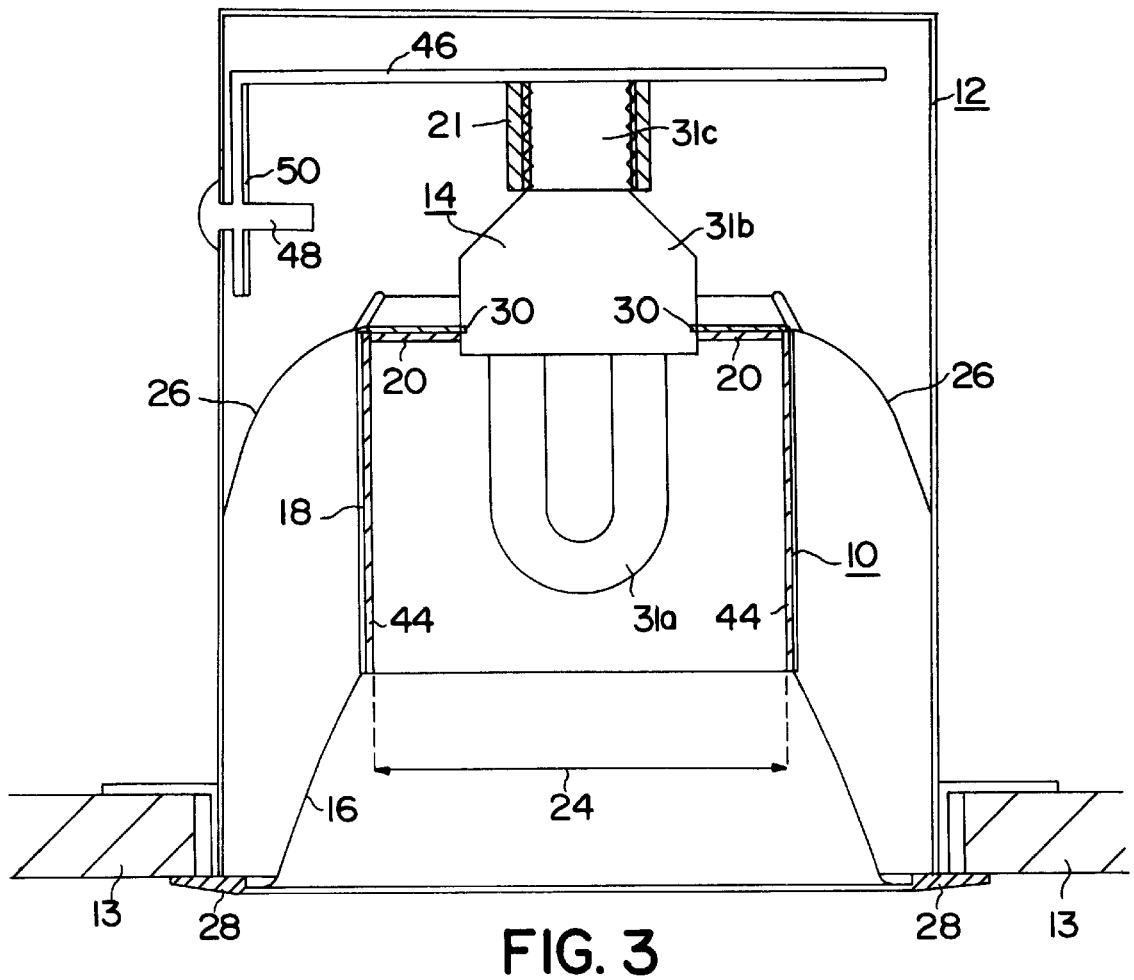
FIG. 3 is a cross-section view of a recessed lamp fixture and a retrofit reflector unit of the present invention.

The preferred embodiment of a reflector unit 10 of the present invention is shown in FIGS. 1 through 3. In FIGS. 1 and 2, the reflector unit is shown in exploded orientation from a conventional recessed light fixture 12, flush mounted in a ceiling 13, and a compact fluorescent lamp (CFL) 14. The reflector unit 10 comprises a reflective lower section 16 having an essentially elliptical shape, and a reflective upper section 18 having an essentially cylindrical shape. The reflector unit is adapted to be inserted within an existing lamp fixture 12 and provide a carefully proportioned reflective surface to maximize light output from the compact fluorescent lamp 14.

The present invention also includes a reflective disk 20 adapted to be mounted on or around the base of a CFL 14 creating a lamp assembly 15 and fit within the upper section 18 of the reflector unit. The reflective disk has an outer diameter 22 substantially matching an inner diameter 24 of the upper section 18 so as to minimize light loss within the reflector unit. In other words, the reflective disk 20 is inserted within the upper section 18 of the reflector unit 10 to provide a reflective backplane, directing light out of the reflector unit effectively. To this end, the reflective disk 20 can be proportioned to closely match the interior dimensions of the upper section 18 so that light is not allowed to leak behind the reflective disk and become "wasted" within the reflector 10 or light fixture 12. Ideally the reflective disk 20 is proportioned to be approximately equal to the interior transverse cross-section dimensions of the upper section 18. It should be appreciated that under certain circumstances the reflective disk 20 may actually be proportioned to be slightly larger than the interior dimensions of the upper section 18, with the disk 20 bending to overlap a portion of the interior wall of the upper section 18 to form a light-tight fit against the wall.

It should further be appreciated that vents (i.e., air gaps) may be incorporated in the reflective disk 20 to allow for increased convective cooling of the lamp and ballast to thereby enable the CFL to operate more efficiently. These vents may take the form of holes within the disk 20 and/or may comprise gaps between the disk 20 and the CFL 14. Vents may also be provided between the disk 20 and the inner diameter of the upper section 18. As such, the term "substantially matching" should be interpreted to allow for vents between the disk 20 and the inner diameter of the upper section 18.

It should be appreciated that it is preferred that the lower section 16 comprises as close as possible to an elliptical shape, although changes or modifications to this basic shape may be made without seriously departing from the benefits of the present invention. In this respect, the lower section may comprise any curves or combination of curves generally classified as conic sections, including without limitation an ellipse, parabola, circle, and/or hyperbola. Similarly, the upper section 18 may comprise a pure cylindrical shape or may take a variety of other basically cylindrical forms, such as having an angular structure (e.g., hexagon, octagon, etc.) and/or having a tapered or modified conical structure. As such, the terms "essentially elliptical" and "essentially cylindrical" should be interpreted to include any such structure having generally the stated shape.

Preferably, the position of the reflector unit 10 and reflective disk 20 can be adjusted relative to one another so as to custom fit the position of the CFL lamp to the dimensions of each lamp fixture. In this way the reflective unit 10 can be mounted into the light fixture 12 to be flush with the ceiling 13 while the lamp 14 and the reflective disk 20 can be independently adjusted to assume the optimal position with the reflector unit 10. As is explained in detail below, in many instances an electrical socket 21 within the existing light fixture 12 can be adjusted to different vertical positions, which allows the lamp to be exactly positioned within the reflector unit 10.

In order to hold the reflector unit 10 in place within the light fixture 12, attachment means 26 should be provided. The attachment means 26 shown in FIGS. 1 through 3 are retention (i.e., spring) clips, which connect the reflector unit 10 to the light fixture 12 and hold it in place therein. It should be understood that the attachment means may comprise any other structure that accomplishes this end. For example, the reflector unit 10 may be held in place through, inter alia, a friction fit, one or more coiled springs, pressure sensitive adhesives, threaded attachment, or other mechanical or chemical fasteners. Additionally, attachment may also be accomplished by using the CFL 14 and attached reflective disk 20 to hold the reflector unit 10 in place.

The reflector unit 10 of the present invention can be constructed from any suitable material, such as metal (e.g., spun aluminum, stainless steel, metal alloys, etc.), or plastic. As is explained in greater detail below, ideally, the reflector unit 10 is coated with a highly reflective material, such as diffuse materials (e.g., white pigment, polytetrafluoroethylene (PTFE)), or specular materials (e.g., mirrored finish), etc., to provide high light output from the reflector unit 10. Depending on the diffuse reflective material used, an adhesive may be used to attach the reflective material to the reflector unit 10.

A trim ring 28 is preferably used to provide a finished presentation around the lamp fixture 12. As is shown in FIGS. 1 through 3, a trim ring 28 is particularly suitable for providing an aesthetic finish around a light fixture 12 mounted flush with the ceiling 13.

The preferred reflective disk 20 comprises a fairly rigid material that is dimensioned to attach around and snap into a groove 30 commonly provided on commercially available CFLs 14. For example, the lamp shown in the drawings is a Universal CFL lamp commercially available from Philips Lighting Company of Somerset, N.J., under the trademark EARTHLIGHT®. This lamp comprises a fluorescent tube or tubes 31a, a body 31b that incorporates a ballast, and a screw base 31c for electrical connection. The base 31c is adapted to be screwed into a conventional Edison-type incandescent light fixture.

The base 31c of this lamp comprises basically a square cross-section having rounded corners, measuring approximately 5.5 cm along its longest x and y axes. Approximately 0.5 cm from a top face 32 of this lamp is a circumferential groove 30 measuring approximately 1 mm deep and 1 mm wide.

In order to interface with this groove, a reflective disk 20 of the present invention is provided with an opening 34 therein having dimensions approximately equal to the cross-section dimensions of the lamp. Overall, the disk is preferably circular having a diameter of about 9.5 cm and a depth of about 1 mm. Proportioned in this manner, the disk readily slides over the commercially available lamp and snaps into place into the groove 30.

Figure 4:
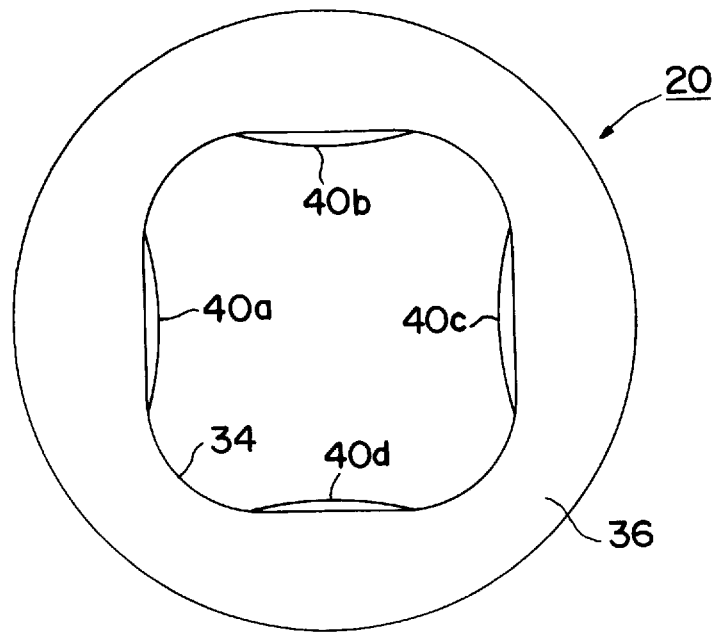
FIG. 4 is a top plan view of one embodiment of a reflective disk of the present invention.
Figure 5:
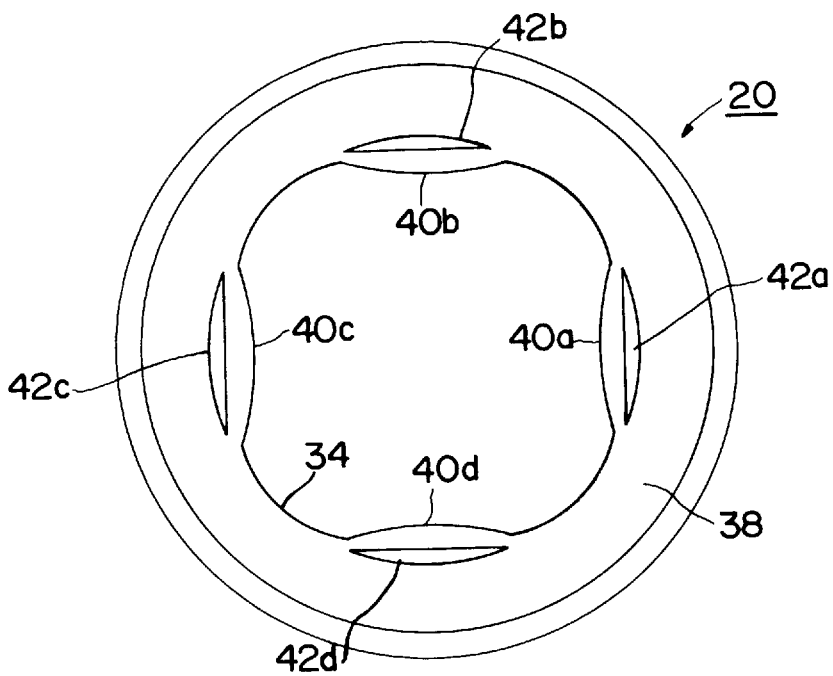
FIG. 5 is a bottom plan view of the reflective disk of FIG. 4.

The preferred reflective disk 20 for use in the present invention is shown in FIGS. 4 and 5. As can been seen, the disk has a light reflective surface 36 comprising a highly light reflective material and a rigid substrate surface 38. The preferred reflective material comprises an expanded PTFE, such as that taught in U.S. Pat. No. 5,596,450 to Hannon et al., incorporated by reference, and the preferred substrate material comprises a plastic sheet, such as polyester or molded plastic resin such as propylene. The reflective material is preferably adhered to the substrate through use of an adhesive.

In order to facilitate attachment to the groove 30 in the CFL 14, the substrate material includes one or more lips 40a, 40b, 40c, 40d around the opening 34. To assist in flexing the reflective disk 20 into position within the groove 30, one or more gaps 42a, 42b, 42c, 42d may be provided in the substrate 38. These gaps 42 allow the substrate material to bend to move the lips 40 away from the CFL when the reflective disk 20 is slid into place, with the lips snapping into position within the groove 30 once the disk is properly positioned.

In the preferred embodiment of the present invention illustrated, it has been found that the best light output can be achieved by providing both diffuse and specular light reflectant surfaces on the reflector unit 10. As can be seen in FIG. 3, the lower section 16 is a specular reflective surface, such as polished spun aluminum. Conversely, the upper section 18 is lined with a diffusely reflective material 44, such as expanded PTFE, similar to the construction of the reflective disk 20 described above. It has been found that this combination of materials provides excellent light output properties, very similar in aesthetics to conventional incandescent reflector lamps.

In order to balance aesthetics and light output, the lamp assembly 15 should be positioned as deep as possible within the upper section of the reflector unit 10. As has been noted, many electrical sockets 21 within recessed light fixtures 12 are mounted on a height adjustable bracket 46. Typically, this bracket can be adjusted vertically within the fixture by loosening a screw type fastener 48 contained in a vertical slot 50 of the fixture 12. Where such adjustable sockets are available, it has been found that the socket should be adjusted to a position that fully inserts the lamp assembly 15 within the reflector unit 10, as is shown in FIG. 3. The independent movement between the reflector unit 10 and the lamp assembly 15 of the present invention allows the user to easily adjust the lamp assembly 15 to a preferred position that looks good while maximizing light output.

Moreover, the relative adjustability of the reflector unit 10 and reflective disk 20 of the present invention allow the present invention to be employed in a wide variety of fixtures that do not provide for socket height adjustment. While there exists a range of adjustable socket to aperture distances within the various models from different manufactures, some models do not allow for any adjustability in the socket to aperture distance. To this end, the independent adjustability of the reflector unit 10 and lamp assembly 15 within the present invention provides ready retrofit of the present invention into these non-adjustable units.

As is shown in FIG. 3, the upper section 14 in this preferred embodiment has essentially parallel walls that allow for the reflector disk 20 and CFL 14 to travel vertically within the cavity of the upper section 18 parallel to the walls. This travel allows for varying fixtures with different socket to aperture distances to be retrofitted with this unit. The unique design of this system maximizes optical performance throughout the entire range of travel. For recessed fixtures that have an extremely deep socket to aperture recess, socket extenders can be used in combination with this vertical adjustability to accommodate the fixture.

One of the important features of the present invention is its ability to adapt effectively to a much wider range of retrofit applications than existing CFL retrofit devices. A typical CFL retrofit device today utilizes substantially specular reflectors. As a result, the lamp placement within the specular reflector must be carefully positioned in order to assure proper light output. This has proven to be a difficult task, though, due to the distributed nature of light output from CFLs (i.e., unlike an incandescent bulb that generally has a narrow section of intense light output that can be controlled using a specular elliptical reflector, the light output from a CFL lamp is essentially even over the entire length of the tube or tubes, making light control much less effective). The process of light output control is made even more difficult by height limitations imposed by most existing recessed fixtures and differences in lamp size and design between different commercial CFLs.

As has been explained, in a preferred embodiment of the present invention retrofit reflector unit 10 of the present invention is hybrid in nature—part diffuse and part specular. By lining or coating the upper cylindrical section 18 with a diffuse reflective material, the combination of the lamp tubes, the reflective walls, and the reflective backplane can be considered (for the purpose of designing the specular section) a diffuse area light source. As a result, the lamp need not be exactly positioned within the reflector in order to achieve the benefits of the present invention. For example, the exact location of the lamp within the upper section 18 will have little effect on the light distribution emanating from the luminaire. For the same reason, this design also accommodates lamps of different sizes and manufacturers without significantly impacting the light output. The specular section of the hybrid reflector can then be designed to control the light output from the combination lamp tubes/diffuse section.

It should be appreciated, however, that the total light output from the reflector unit of the present invention is significantly impacted by the effective diffuse reflectance of light from the upper section 18 of the reflector unit 10. This is far less critical in the case with purely specular systems that employ precisely designed reflectors optimized for one position of a specific CFL to control the distribution of the light. Accordingly, it is highly desirable in the present invention to employ a highly efficient diffuse reflective material (i.e. >95% reflective) such as PTFE, and even more desirable, expanded PTFE having a polymeric node and fibril structure such as that taught in U.S. Pat. No. 5,596,450 to Hannon et al.

Without intending to limit the scope of the present invention, the following examples illustrate how the present invention may be made and used:

EXAMPLE 1

A reflector unit of the present invention is fabricated from aluminum sheet through a spun metal process and treated with an ALZAK finish. It can be made to fit a variety of recessed housings, one of the most common being the H-7 style recessed can with an aperture diameter of about 152 mm and a height typically ranging from about 140 to 230 mm.

The reflector unit 10 is fabricated to have a profile similar to that illustrated in FIGS. 1 through 3, which preferably has an aperture of about 146 mm. The upper cylindrical section 18 has a diameter of about 89 mm and a height of about 76 mm. The overall height of the reflector is about 145 mm.

The reflector unit incorporates highly diffusely reflective expanded PTFE reflective material of about 1 mm thick having a diffuse reflectance of at least 98%, such as that described in U.S. Pat. No. 5,596,450. Other diffuse reflective materials can be employed such as white enamel paint or diffuse aluminum. Other specular reflective materials may also be employed such as specular coated aluminum sold under the trademark ALZAK® by Alcoa or SILVERLUX® film available from the 3M Company.

A 1 mm thick expanded PTFE reflective material is used as the reflective material 36 of the reflector disk 20. An acrylic based pressure sensitive adhesive is used as the adhesive to attach the expanded PTFE to the rigid substrate disk 38 comprising a 0.36 mm thick polyester based film.

The light output of the above retrofit system in a 6 inch (152 mm) diameter H-7 style "can" fixture was tested by an outside professional testing facility, Luminaire Testing Laboratory, of Allentown Pa. The tests were conducted according to Illuminating Engineering Society (IES) procedure LM41.

Testing was performed using both 15 and 20 watt CFL lamps. Two different sizes of Philips EARTHLIGHT® CFL lamps were utilized for this test, a 15 Watt SLS-15 and a 20 Watt SLS-20.

The results are shown in the following table:

| CFL Lamp Wattage | Stated Lamp Luminance (Lumens) | Inventive Retrofit Fixture Luminance (Lumens) | Inventive Retrofit Fixture Efficiency (%) |
|---|---|---|---|
| 15 watt | 900 | 620 | 68.9 |
| 20 watt | 1200 | 835 | 69.6 |

While particular embodiments of the present invention have been illustrated and described herein, the present invention should not be limited to such illustrations and descriptions. It should be apparent that changes and modifications may be incorporated and embodied as part of the present invention within the scope of the following claims.

The invention claimed is:

1. A reflector unit adapted to be installed inside of an existing lamp fixture, the reflector unit comprising
   a reflective upper section;
   means for attaching the reflector unit inside of the lamp fixture;
   a reflective disk adapted to be attached to a lamp;
   the reflective disk having an outer diameter substantially matching an inner diameter of the upper section so as to allow the disk to mount within the upper section; and
   wherein the upper section comprises expanded polytetrafluoroethylene.

2. The reflector unit of claim 1 that further comprises a reflective lower section.

3. The reflector unit of claim 2 wherein the lower section is essentially elliptical in shape.

4. The reflector unit of claim 3 wherein the lower section comprises a specular reflective material.

5. The reflector unit of claim 1 wherein the reflective disk comprises expanded polytetrafluoroethylene.

6. The reflector unit of claim 5 wherein the reflective disk comprises a relatively stiff substrate having a layer of expanded polytetrafluoroethylene attached thereto.

7. The reflector unit of claim 1 wherein the reflective disk includes means to assume different vertical positions within the upper section to allow the lamp and reflective disk to be positioned in different positions relative to the reflector unit.

8. The reflector unit of claim 1 wherein the upper section comprises an essentially cylindrical shape.

9. The reflector unit of claim 1 wherein the reflective disk has an opening therein adapted to be attached around a base on the lamp.

10. The reflector unit of claim 1 wherein
    the lamp has a base having a groove therein; and
    the reflective disk is proportioned to attach within the groove.

11. The reflector unit of claim 1 wherein the means for attaching the reflector unit inside of the lamp fixture comprises a retainer clip.

12. A reflector unit adapted to be installed inside of an existing lamp fixture, the reflector unit comprising
    a reflective upper section;
    a reflective lower section;
    means for attaching the reflector unit inside of the lamp fixture;
    a reflective disk adapted to be attached to a lamp;
    the reflective disk having an outer diameter substantially matching an inner diameter of the upper section, the reflective disk includes means, to assume different vertical positions within the upper section to allow the lamp and reflective disk to be positioned in different positions within the reflector unit.

13. The reflector unit of claim 12 wherein the upper section and the reflective disk are highly diffuse reflective.

14. The reflector unit of claim 13 wherein diffuse reflectivity is provided by expanded polytetrafluoroethylene.

15. The reflective unit of claim 12 wherein
    the upper section comprises an essentially cylindrical shape;
    and
    the lower section comprises an essentially elliptical shape.

16. The reflective unit of claim 15 wherein the upper section comprises a diffuse reflective material.

17. The reflective unit of claim 16 wherein the lower section comprises a specular reflective material.

18. The reflective unit of claim 16 wherein the diffuse reflective material comprises an expanded polytetrafluoroethylene.

19. A reflector unit adapted to be installed inside an existing lamp fixture, the reflector unit comprising:
    a reflector retrofit adapted to be attached to and retained by the existing light fixture;
    wherein the reflector retrofit is proportioned to receive a lamp therein without attachment between the lamp and the reflector retrofit;
    wherein the reflector retrofit includes an upper section and a lower section; and
    wherein the lower section comprises a specular reflective material; and wherein the upper section comprises a diffuse reflective material.

20. The reflector unit of claim 19 wherein a reflective disk is included adapted to attach around the lamp and move relative to the reflector retrofit.

21. The reflector unit of claim 19 wherein the lower section is essentially elliptical in shape.

22. The reflector unit of claim 19 wherein the upper section comprises expanded polytetrafluoroethylene.

23. The reflector unit of claim 20 wherein the reflective disk comprises expanded polytetrafluoroethylene.

24. The reflector unit of claim 23 wherein the reflective disk comprises a relatively stiff substrate having a layer of expanded polytetrafluoroethylene attached thereto.

25. The reflector unit of claim 20 wherein the reflector retrofit includes an upper section and a lower section; and the reflective disk includes means to be positioned in different positions relative to the upper section.

26. The reflector unit of claim 25 wherein the upper section comprises an essentially cylindrical shape.

27. The reflector unit of claim 25 wherein the reflective disk has an opening therein adapted to be attached around a base on the lamp.

28. The reflector unit of claim 1 wherein the lamp comprises a compact fluorescent lamp.

29. The reflector unit of claim 12 wherein the lamp comprises a compact fluorescent lamp.

30. The reflector unit of claim 19 wherein the lamp comprises a compact fluorescent lamp.

31. A reflector unit adapted to be installed inside of an existing lamp fixture, the reflector unit comprising a reflective upper section;

means for attaching the reflector unit inside of the lamp fixture;

a reflective disk adapted to be attached to a lamp;

the reflective disk having an outer diameter substantially matching an inner diameter of the upper section so as to allow the disk to mount within the upper section; and wherein the reflective disk comprises expanded polytetrafluoroethylene.

32. The reflector unit of claim 31 wherein the reflective disk comprises a relatively stiff substrate having a layer of expanded polytetrafluoroethylene attached thereto.

33. The reflector unit of claim 31 wherein the upper section comprises expanded polytetrafluoroethylene.

34. The reflector unit of claim 31 wherein the lamp comprises a compact fluorescent lamp.

35. The reflector unit of claim 31 wherein the reflective disk includes means to assume different vertical positions within the upper section to allow the lamp and reflective disk to be positioned in different positions relative to the reflector unit.

36. The reflector unit of claim 31 wherein the lamp comprises a compact fluorescent lamp.

37. A reflector unit adapted to be installed inside of an existing lamp fixture, the reflector unit comprising a reflective upper section;

means for attaching the reflector unit inside of the lamp fixture;

a reflective disk adapted to be attached to a lamp;

the reflective disk having an outer diameter substantially matching an inner diameter of the upper section so as to allow the disk to mount within the upper section; and wherein the reflective disk includes means to assume different vertical positions within the upper section to allow the lamp and reflective disk to be positioned in different positions relative to the reflector unit.

38. The reflector unit of claim 37 wherein the upper section comprises expanded polytetrafluoroethylene.

39. The reflector unit of claim 37 wherein the reflective disk comprises expanded polytetrafluoroethylene.

40. The reflector unit of claim 39 wherein the reflective disk comprises a relatively stiff substrate having a layer of expanded polytetrafluoroethylene attached thereto.

41. The reflector unit of claim 37 wherein the lamp comprises a compact fluorescent lamp.

42. A reflector unit adapted to be installed inside of an existing lamp fixture, the reflector unit comprising a reflective upper section; a reflective lower section, means for attaching the reflector unit inside of the lamp fixture;

a reflective disk adapted to be attached to a lamp;

the reflective disk having an outer diameter substantially matching an inner diameter of the upper section so as to allow the disk to mount within the upper section;

wherein the lower section is essentially elliptical in shape and comprises a specular reflective material.

43. The reflector unit of claim 42 wherein the upper section comprises expanded polytetrafluoroethylene.

44. The reflector unit of claim 42 wherein the reflective disk comprises expanded polytetrafluoroethylene.

45. The reflector unit of claim 44 wherein the reflective disk comprises a relatively stiff substrate having a layer of expanded polytetrafluoroethylene attached thereto.

46. The reflector unit of claim 42 wherein the lamp comprises a compact fluorescent lamp.

* * * * *